C. D. PLATT.
PROTECTIVE BOX FOR METER CONNECTIONS.
APPLICATION FILED NOV. 21, 1917.
1,272,086.
Patented July 9, 1918.
2 SHEETS—SHEET 2.
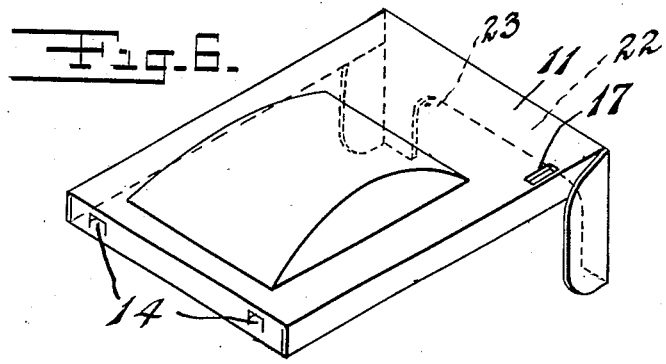
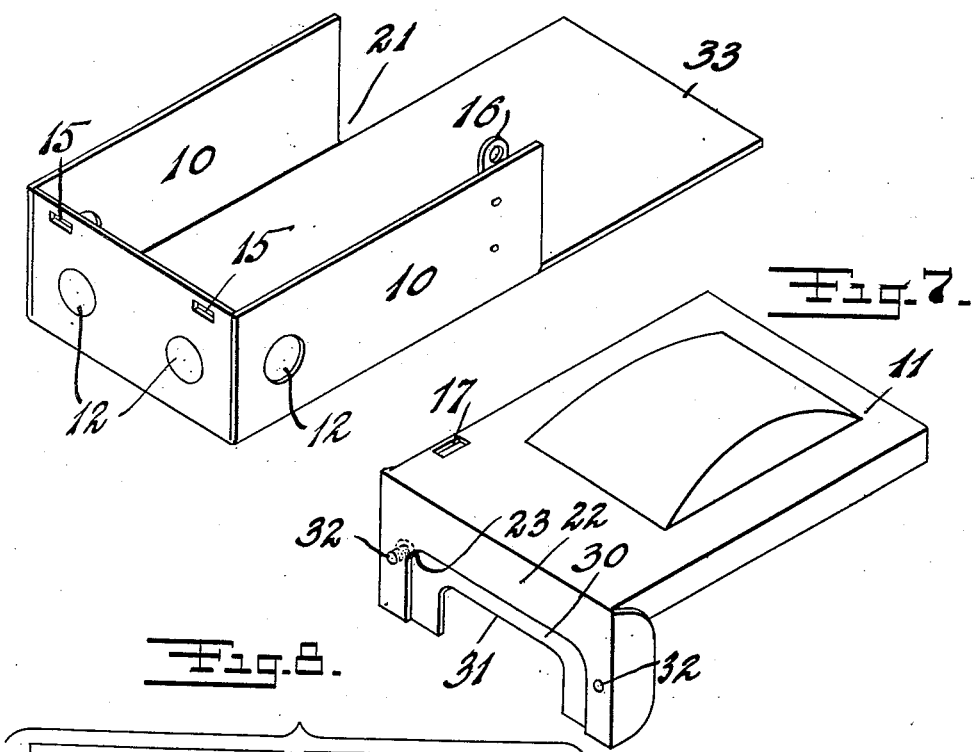
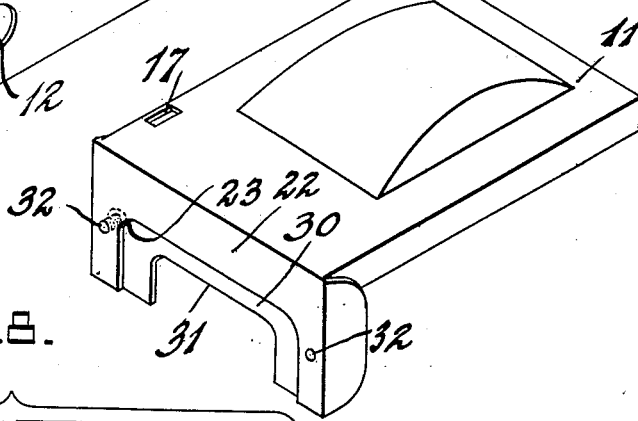
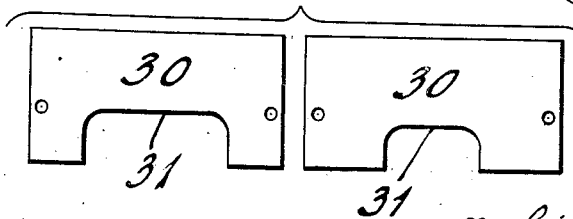
Inventor
C. D. Platt
By his Attorneys

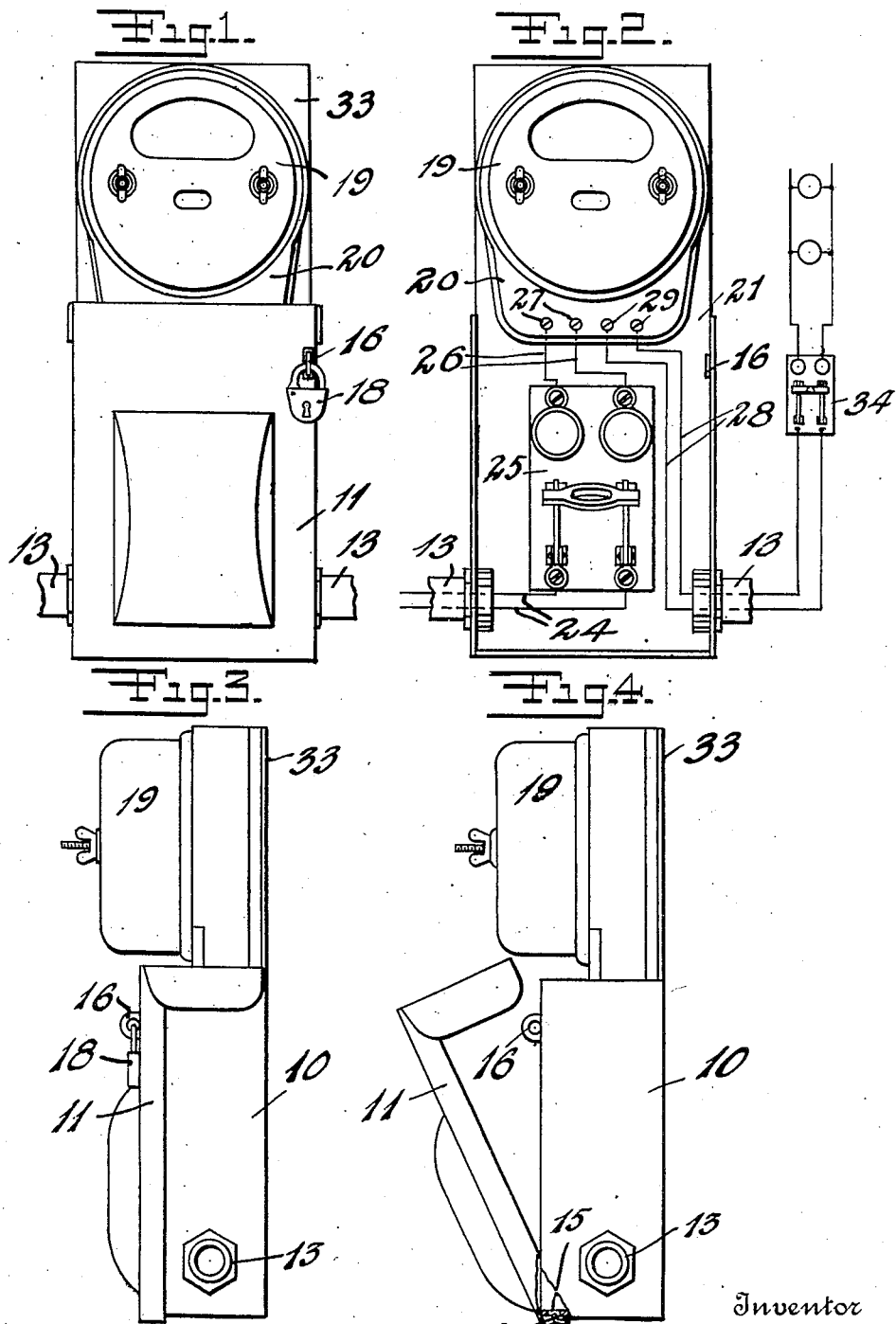

UNITED STATES PATENT OFFICE.

CLARENCE D. PLATT, OF BRIDGEPORT, CONNECTICUT.

PROTECTIVE BOX FOR METER CONNECTIONS.

1,272,086.  Specification of Letters Patent.  Patented July 9, 1918.

Application filed November 21, 1917. Serial No. 203,125.

*To all whom it may concern:*

Be it known that I, CLARENCE D. PLATT, a citizen of the United States of America, residing at Bridgeport, Connecticut, have invented a new and useful Protective Box for Meter Connections, of which the following is a specification.

This invention is in the nature of a meter protective device and the objects of the invention are to provide simple and effective means for preventing unauthorized tampering with the meter connections and to prevent theft of current by by-passing the meter.

Another object is to combine protective means of this character with a switch box such as is used in practice in connection with meters.

Briefly stated the invention comprises a switch box which is constructed to form a protective housing for the meter connections. This is accomplished usually by making the switch box in two main sections, a box body and a cover therefor, the box body having an opening in the end thereof to receive the meter connections and the cover having an end portion coöperating with such open end of the box body to form a housing for such meter connections.

Other features of the invention will appear as the specification proceeds.

In the accompanying drawing I have illustrated the invention embodied in practical and preferred forms but I would have it understood that various changes and modifications may be indulged in without departing from the true spirit and scope of the invention.

In said drawing:—

Figure 1, is a front view of the invention in use in connection with a meter, the box in this particular view being sealed in the closed condition.

Fig. 2, is a similar view with the cover opened to expose the switch within the box and the connections with the meter.

Fig. 3, is a side view of the box as shown in Fig. 1.

Fig. 4, is a side view with the cover opened, portions of the box being broken away and shown in section to illustrate the hinge construction.

Fig. 5, is a perspective view of the body member of the box.

Fig. 6, is a similar view of the cover portion of the box.

Figs. 7 and 8 are detail views illustrating a special construction of "adapter" plates for adapting the cover to meters of different types.

The main or body portion of the box or casing is designated 10 and the cover element is designated 11. These parts are usually formed up of sheet metal as customary in this art and suitable provision is made for carrying the current conducting wires into and out of the box, as by providing "knock-outs" 12 in the sides of the box for admitting suitable conduit connections 13.

The cover may be hinged or otherwise suitably connected with the box body. In the illustration said cover has a removable hinged connection with the box body by means of lugs 14 struck inwardly from the lower end wall of the cover which engage in openings 15 provided therefor in the lower end wall of the box body. This provides a hinge connection between the two parts and at the same time enables the cover being entirely removed from the box body. The cover also may be secured or locked in place in any suitable way. In the present instance the box body carries an upstanding locking lug 16 designed to pass through an opening 17 in the top of the cover and which is perforated to receive a padlock 18 or other suitable locking or sealing device.

19 designates a meter of typical construction which is shown provided with a dependent terminal extension or chamber 20, as customary in devices of this character. The electrical connections of the meter are protected in the case illustrated by constructing the switch box to receive this terminal chamber of the meter so as to thereby entirely house and protect such connections. Specifically this is accomplished by providing an opening in the upper end of the box body of sufficient size to receive the terminal chamber and by providing the cover with an end wall to fit over and around the terminal chamber. In the case illustrated the upper end of the box body is left entirely open as indicated at 21, and the upper end wall 22 of the cover closes this open end of the box body and is recessed or cut away as indicated at 23 to fit closely over the terminal chamber of the meter.

By this construction the entire electrical connections of the meter, including the terminal chamber itself, are entirely protected but at the same time said connections may be quickly exposed by simply opening the cover of the box.

The wiring connections may vary to suit different circumstances, a typical set of connections being shown in Fig. 2 wherein the line wires 24 are connected with the lower terminals of an ordinary fused knife switch 25, the upper terminals of said switch being connected by wires 26 with two of the terminals 27 of the meter and the load wires 28 being connected with the other two terminals 29 of the meter. With my invention this entire set of connections is wholly protected but at the same time is readily accessible to one authorized to open the box.

To adapt the invention to meters of different types, I may make use of a construction like that shown in Figs. 7 and 8, embodying "adapters" in the nature of plates 30 which may be plain or be provided with cut-outs 31 of different sizes to fit different sizes or shapes of meters, said adapter plates being interchangeably secured over the opening 23 provided in the end wall of the cover as by means of screws 32, said screws being preferably entered from the inside of the cover so as to be inaccessible from the outside. In this form of construction the opening or cut-out 23 in the end of the cover is made sufficiently large to receive the different sizes or shapes of meter terminal chambers and the different adapter plates are cut out so as to just fit different individual meters.

Another feature of this invention is the provision of the box body with an extension 33, forming a continuation of the back of the box at the open end of the same and serving as a panel for the mounting of the meter. This insures the switch box being mounted in proper relation to insure the protection of the meter connections and enables also, when desired, the meter and switch box being set up as a single unit.

From the foregoing it will be seen that this invention provides a complete protection for the meter connections and at the same time enables ready inspection of such connections by the proper parties. Also, while the meter is thoroughly protected this does not in any way interfere with the proper operation of the switch which is ordinarily accessible to the consumer. This feature is brought out more particularly in Fig. 2 where it will be seen that while the meter connections are entirely protected the consumer's switch, indicated at 34, is wholly accessible for the purpose of cutting the load "on" or "off".

I claim:

1. A protective box for meter connections comprising a box body open at one end to admit the terminal chamber of a meter, a cover secured to said box body having a cut away portion to receive the terminal chamber, and an adapter secured over said cut-away portion and closely fitting said terminal chamber.

2. In combination, a box body open at one end to receive the electrical connections of a meter, a cover secured to said box body and having an end wall for closing the open end of the box body, said end wall being cut away to receive the meter connections, adapter plates of different design to fit different styles of meter connections, and means for securing selected adapter plates over said cut-away end of the cover.

3. A switch box comprising a box body open at the front and at one end, and a cover secured to said box body, said cover having an end wall partially closing the open end of the box body and recessed to admit meter connections directly into said switch box.

4. A switch box comprising a box body open at the front and at one end, and a cover secured to said box body, said cover having an end wall partially closing the open end of the box body and recessed to admit meter connections directly into said switch box, said box body having an extension at the open end thereof forming a support for a meter, and a meter mounted on said support having the electrical connections therewith disposed within the switch box.

C. D. PLATT.